(12) United States Patent
Sumi

(10) Patent No.: US 11,212,513 B2
(45) Date of Patent: Dec. 28, 2021

(54) METHOD FOR DISPLAYING A STEREOSCOPIC IMAGE ON A DISPLAY DEVICE

(71) Applicant: InnoLux Corporation, Miao-Li County (TW)

(72) Inventor: Naoki Sumi, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 26 days.

(21) Appl. No.: 16/835,280

(22) Filed: Mar. 30, 2020

(65) Prior Publication Data

US 2021/0006774 A1 Jan. 7, 2021

Related U.S. Application Data

(60) Provisional application No. 62/870,062, filed on Jul. 3, 2019.

(51) Int. Cl.
| | |
|---|---|
| *H04N 13/312* | (2018.01) |
| *H04N 13/111* | (2018.01) |
| *H04N 13/351* | (2018.01) |
| *H04N 13/317* | (2018.01) |

(52) U.S. Cl.
CPC ........ *H04N 13/312* (2018.05); *H04N 13/111* (2018.05); *H04N 13/317* (2018.05); *H04N 13/351* (2018.05)

(58) Field of Classification Search
CPC .. H04N 13/312; H04N 13/111; H04N 13/351; H04N 13/317
See application file for complete search history.

(56) References Cited

U.S. PATENT DOCUMENTS

| | | | |
|---|---|---|---|
| 6,219,070 B1* | 4/2001 | Baker | G06T 13/00 345/426 |
| 6,801,243 B1 | 10/2004 | Van Berkel | |
| 9,699,443 B2* | 7/2017 | Niu | H04N 13/257 |
| 2007/0182738 A1* | 8/2007 | Feldman | H04N 13/305 345/427 |
| 2014/0071181 A1* | 3/2014 | Mishima | H04N 13/317 345/690 |

(Continued)

FOREIGN PATENT DOCUMENTS

WO WO-2020152149 A1 * 7/2020 ........... H04N 13/351

*Primary Examiner* — Joseph G Ustaris
*Assistant Examiner* — Jill D Sechser
(74) *Attorney, Agent, or Firm* — Winston Hsu

(57) ABSTRACT

A display device includes a plurality of pixels and an optical modulator. A method for displaying a stereoscopic image on the display device includes obtaining image data of the stereoscopic image corresponding to K views, for each sub-pixel in each of the pixels, determining location parameters of the sub-pixel according to a first coordinate value of the sub-pixel along a first direction, a first number of sub-pixels along the first direction in each pixel, a second coordinate value of the sub-pixel along a second direction, and a second number of sub-pixels along the second direction in each pixel, determining a corresponding view corresponding to the sub-pixel according to a pitch and a slant angle of the optical modulator, the location parameters, and a visual offset caused by the optical modulator, and assigning displaying data to the sub-pixel according to the corresponding view and the image data.

16 Claims, 8 Drawing Sheets

(56) References Cited

U.S. PATENT DOCUMENTS

| | | | |
|---|---|---|---|
| 2015/0015686 A1* | 1/2015 | de la Barre | H04N 13/351 |
| | | | 348/59 |
| 2016/0171917 A1* | 6/2016 | Yang | G09G 3/2003 |
| | | | 345/694 |
| 2017/0104983 A1* | 4/2017 | Lee | H04N 13/305 |
| 2017/0150131 A1* | 5/2017 | Van Putten | G02B 30/27 |
| 2018/0109778 A1* | 4/2018 | Wu | G02B 30/27 |

* cited by examiner

METHOD FOR DISPLAYING A STEREOSCOPIC IMAGE ON A DISPLAY DEVICE

CROSS REFERENCE TO RELATED APPLICATION

This non-provisional application claims priority of U.S. provisional application No. 62/870,062, filed on Jul. 3, 2019, included herein by reference in its entirety.

BACKGROUND OF THE DISCLOSURE

1. Field of the Disclosure

The present disclosure is related to a display device, and more particularly, to a method for displaying a stereoscopic image on the display device.

2. Description of the Prior Art

To present natural three dimensional (3D) images on a display device without using glasses, light field displays and super multi-view displays have been developed. For example, when displaying an object by a light field display, the light field display can use an optical modulator to direct the images of different views of the object to different directions so viewers at different positions can watch different views of the object. In this case, by providing images of appropriate viewing angles to the right eye and the left eye of the viewer, the viewer would be able to sense the 3D visual effect. However, it can be difficult to determine the corresponding views for the pixels of the multi-view display.

SUMMARY OF THE DISCLOSURE

One embodiment of the present invention discloses a method for displaying a stereoscopic image on a display device. The display device includes a plurality of pixels and an optical modulator.

The method includes obtaining image data of the stereoscopic image corresponding to K views, wherein K is an integer greater than 1, for each sub-pixel in at least a portion of the plurality of pixels, determining location parameters of the sub-pixel according to a first coordinate value of the sub-pixel along a first direction, a first number of sub-pixels along the first direction in one of the at least a portion of the plurality of pixels, a second coordinate value of the sub-pixel along a second direction, and a second number of sub-pixels along the second direction in the one of the at least a portion of the plurality of pixels, determining a corresponding view of the K views to which the sub-pixel corresponds to according to the location parameters, a pitch of the optical modulator, a slant angle of the optical modulator, and a visual offset caused by the optical modulator, and assigning displaying data to the sub-pixel according to the corresponding view and the image data.

These and other objectives of the present disclosure will no doubt become obvious to those of ordinary skill in the art after reading the following detailed description of the embodiment that is illustrated in the various figures and drawings.

DETAILED DESCRIPTION

Figure 1:
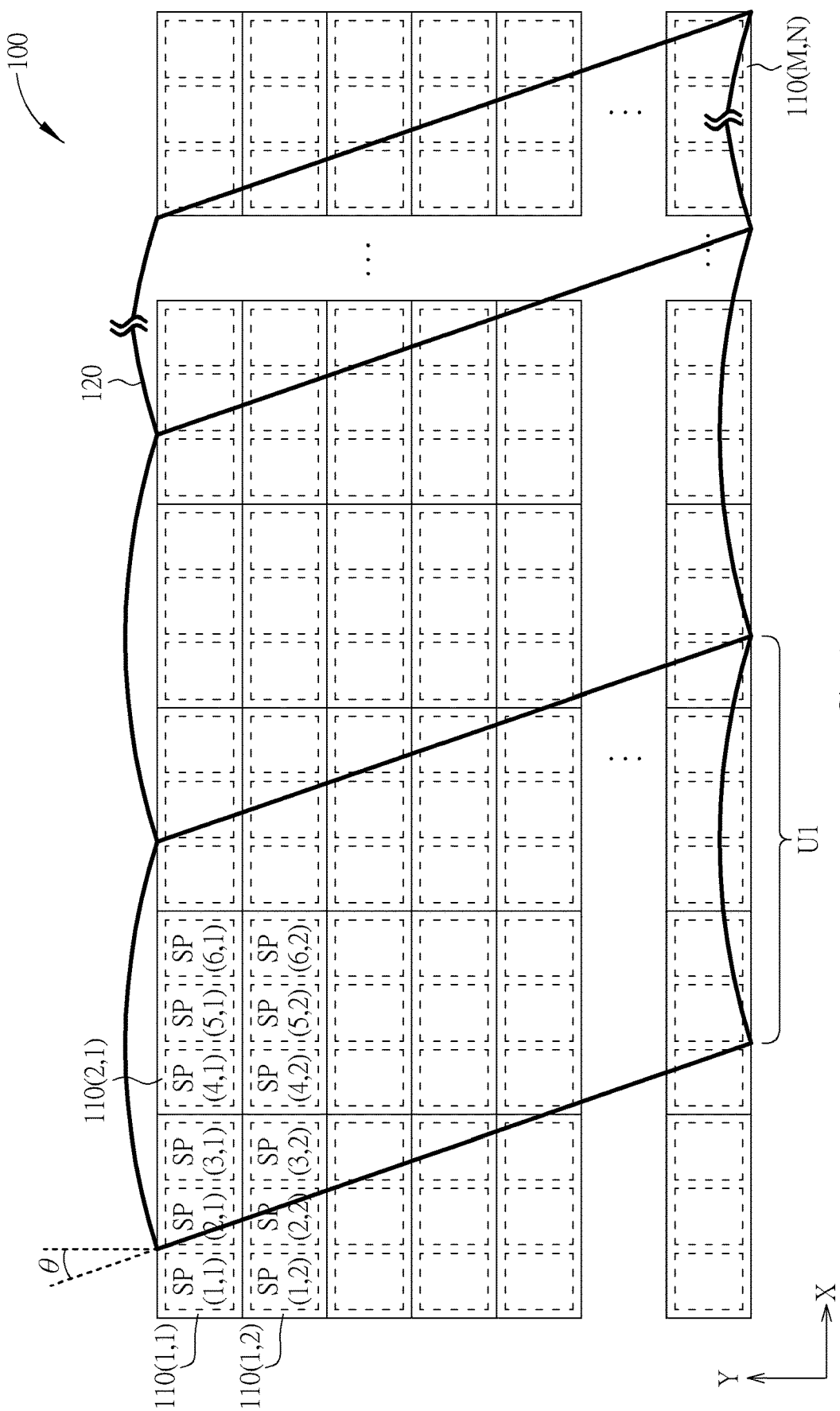
FIG. 1 shows a display device according to one embodiment of the present disclosure.

This description is made for the purpose of illustrating the general principles of the disclosure and should not be taken in a limiting sense.

The term "substantially" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" can mean within one or more standard deviations, or within ±20%, ±15%, ±10%, ±5%, ±3% of the stated value. It is noted that the term "same" may also refer to "about" because of the process deviation or the process fluctuation.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 shows a display device 100 according to one embodiment of the present disclosure. The display device 100 includes a plurality of pixels 110(1,1) to 110(M,N) and an optical modulator 120. In some embodiments, M and N are integers greater than 1.

In some embodiments, the pixels 110(1,1) to 110(M,N) may include organic light emitting diodes (OLED), quantum light emitting diodes (QLED), mini light emitting diodes (mini-LED), micro light emitting diodes (micro-LED), or liquid crystal (LC) cells for emitting light, but they are not limited thereto. Also, the pixels 110(1,1) to 110(M,N) can include a plurality of sub-pixels for emitting light of different colors. For example, in FIG. 1, the pixel 110(1,1) can include three sub-pixels SP(1,1), SP(2,1), and SP(3,1) for emitting red light, green light, and blue light respectively. In other examples, the co-ordination numbers of the sub-pixels along the X direction in the first row may be SP(0,0), SP(1,0), SP(2,0), SP(3,0) and so on, and the co-ordination numbers of the sub-pixels along the Y direction in the first column may be SP(0,0), SP(0,1), SP(0,2), SP(0,3) and so on, but not limited thereto.

In some embodiments, the optical modulator 120 can include at least one of a lenticular film, liquid crystal (LC) grin lenses, parallax barriers, or LC parallax barriers, but it is not limited thereto. The optical modulator 120 can be disposed on the pixels 110(1,1) to 110(M,N) to modulate the light emitted from the sub-pixels of the pixels 110(1,1) to 110(M,N) to corresponding directions. Therefore the viewer's right eye and the left eye may receive images of different views, thereby creating the 3D visual effect. Furthermore, as the viewer shifts her/his viewing position, the viewer may see images transitioning from one view to another. Consequently, by presenting images of different views with the corresponding sub-pixels properly, the stereoscopic visual effect can be implemented.

In addition, in FIG. 1, the optical modulator 120 can be disposed with a slant angle θ so that the transition between images of different views can be diffused, thereby reducing the abrupt changes between images of different views. In some embodiments, the slant angle θ can be determined according to the system requirement, and may be 0 degrees in some embodiments. For example, the slant angle θ may be ranged from 15° to 75°, such as 30°, 45° or 60°, but not limited thereto.

Figure 2:
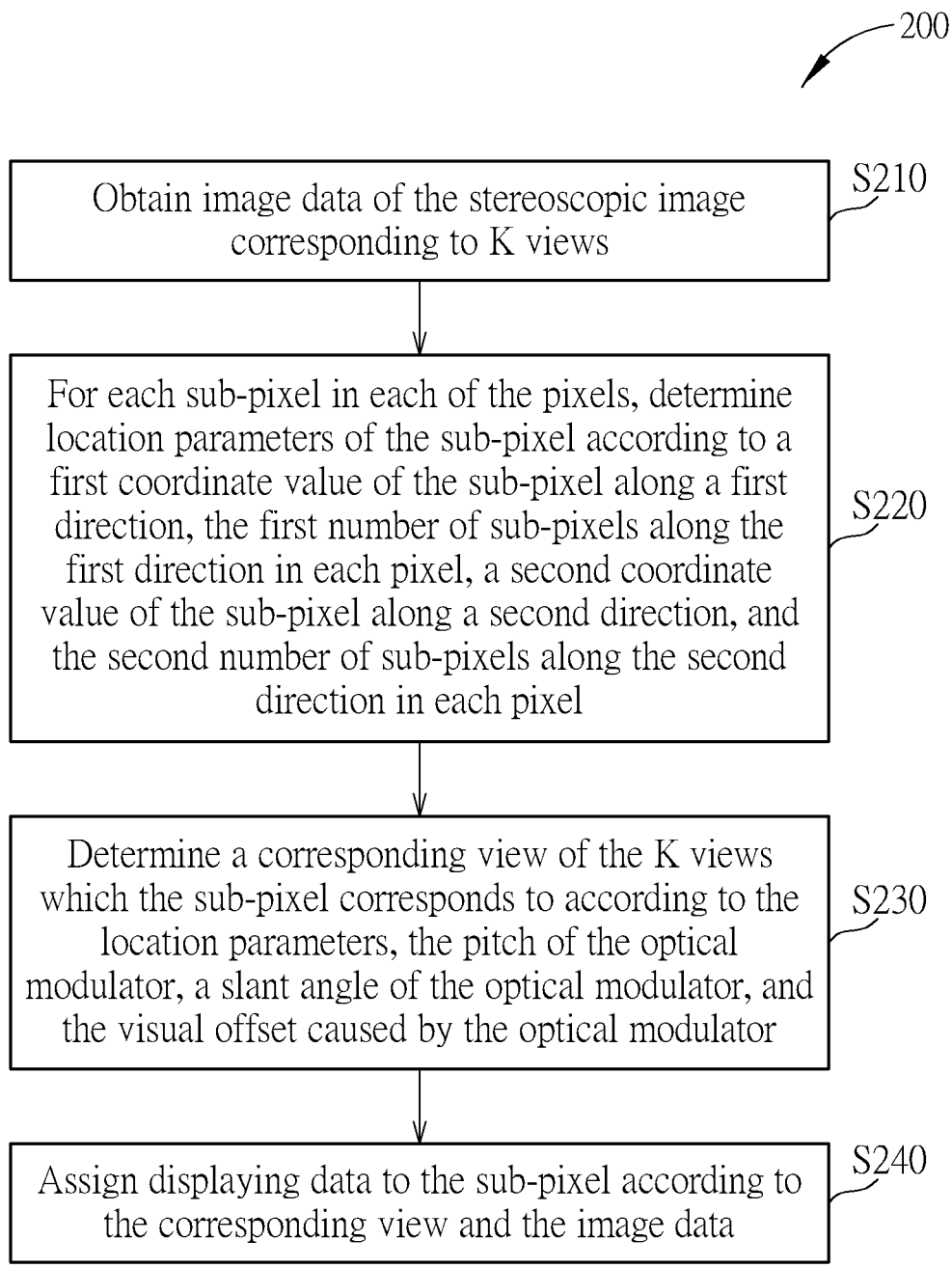
FIG. 2 shows a method for displaying a stereoscopic image on the display device in FIG. 1.

FIG. 2 shows a method 200 for displaying a stereoscopic image on the display device 100. In some embodiments, the method 200 can determine a corresponding view for each sub-pixel in at least a portion of the pixels 110(1,1) to 110(M,N), and the display device 100 can display images of different views to implement the stereoscopic visual effect. The method 200 includes steps S210 to S240.

S210: obtain image data of the stereoscopic image corresponding to K views;

S220: for each sub-pixel in at least a portion of the pixels 110(1,1) to 110(M,N), determine location parameters of the sub-pixel according to a first coordinate value of the sub-pixel along a first direction, the first number of sub-pixels along the first direction in one of the at least a portion of the plurality of pixels, a second coordinate value of the sub-pixel along a second direction, and the second number of sub-pixels along the second direction in the one of the at least a portion of the plurality of pixels;

S230: determine a corresponding view of the K views which the sub-pixel corresponds to according to the location parameters, the pitch of the optical modulator 120, a slant angle of the optical modulator 120, and the visual offset caused by the optical modulator 120; and S240: assign displaying data to the sub-pixel according to the corresponding view and the image data.

In step S210, the stereoscopic image can include image data corresponding to K different views, where K is an integer greater than 1, such as 100, 200, 500, 1000, or 5000, but not limited thereto. For example, K can be 12, and the stereoscopic image would include image data for 12 different views. In some embodiments, the display device 100 may be coupled to an image processor and the method 200 can generate the image data with the image processor in real-time. However, in some other embodiments, the image data may be generated in advance, and the method 200 can read the image data from the corresponding processing circuit or the storage device.

In step S220, the method 200 can determine the location parameters for each sub-pixel in at least a portion of the pixels 110(1,1) to 110(M,N) and the corresponding view of each sub-pixel can be determined accordingly in step S230.

In some embodiments, each of the sub-pixels of at least a portion of the pixels 110(1,1) to 110(M,N) can be numbered with a corresponding pair of coordinates sequentially, and the location parameters of each sub-pixel can be determined according to the first coordinate value along a first direction, the first number of sub-pixels along the first direction in one of the at least a portion of the plurality of pixels, a second coordinate value along a second direction, and the second number of sub-pixels along the second direction in the one of the at least a portion of the plurality of pixels. In one example, each of the pixels of the at least a portion of the pixels 110(1,1) to 110(M,N) may include the same number of sub-pixels, but not limited thereto. In some embodiments, the location parameters can be determined by dividing the first coordinate value by the first number and dividing the second coordinate value by the second number. For example, the location parameters $f_x(i,j)$ and $f_y(i,j)$ of the sub-pixel SP(i,j) can be represented by formula (1) and formula (2).

$$f_x(i,j)=i/a \tag{1}$$

$$f_y(i,j)=j/b \tag{2}$$

In formula (1) and formula (2), i is the first coordinate of the sub-pixel SP(i,j) along the first direction, and j is the second coordinate of the sub-pixel SP(i,j) along the second direction different from the first direction. In some embodiments, the first direction can be the X direction while the second direction can be the Y direction substantially perpendicular to the X direction. Also, a is the number of sub-pixels along the first direction in the pixel, and b is the number of sub-pixels along the second direction in the pixel. For example, in FIG. 1, the pixel 110(1,1) includes sub-pixels SP(1,1), SP(2,1) and SP(3,1) disposed along the X direction, and the pixel 110(2,1) includes sub-pixels SP(4,1), SP(5,1) and SP(6,1) disposed along the X direction. That is, there are three sub-pixels in the pixel 110(1,1) along the X direction, so the first number a would be 3. In this case, the first location parameter $f_x(1,1)$ of the sub-pixel SP(1,1) would be 1/3. Also, since there is one sub-pixel in the pixel 110(1,1) along the Y direction, the second number b would be 1 and the second location parameter $f_y(1,1)$ of the sub-pixel SP(1,1) would be 1/1. Similarly, the first location parameter $f_x(4,1)$ of the sub-pixel SP(4,1) in the pixel 110(2,1) would be 4/3, and the second location parameter $f_y(4,1)$ of the sub-pixel SP(4,1) would be 1/1.

Figure 3:
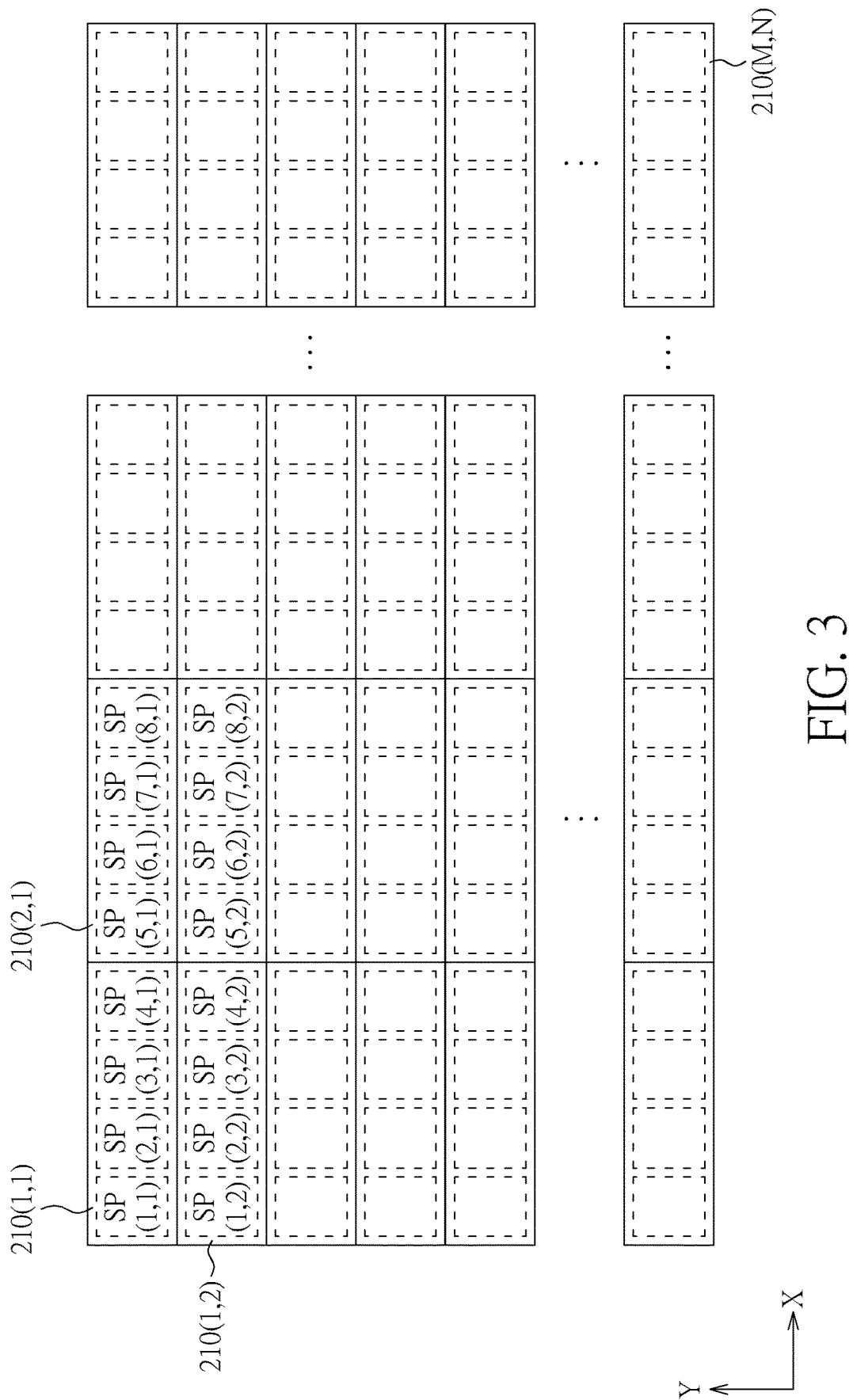
FIG. 3 shows a plurality of pixels according to another embodiment of the present disclosure.

In addition, although in FIG. 1, at least one of the pixels 110(1,1) to 110(M,N) may include three sub-pixels disposed along the first direction, the pixels may have different sub-pixel configurations in some other embodiments. However, the formula (1) and formula (2) can still be applied even when the pixels have different sub-pixel configuration. FIG. 3 shows a plurality of pixels 210(1,1) to 210(M,N) according to another embodiment of the present disclosure. In FIG. 3, each of the pixels 210(1,1) to 210(M,N) includes four sub-pixels. For example, the pixel 210(1,1) may include sub-pixels SP(1,1), SP(2,1), SP(3,1) and SP(4,1) for emitting red light, green light, blue light, and white light respectively. In pixel 210(1,1), there are four sub-pixels along the X direction so the first number a would be 4. Also, there is one sub-pixel along the Y direction so the second number b would be 1. In this case, the first location parameter $f_x(1,1)$ of the sub-pixel SP(1,1) in the pixel 210(1,1) would be 1/4, and the second location parameter $f_y(1,1)$ of the sub-pixel SP(1,1) would be 1/1. Also, the first location parameter $f_x(5,1)$ of the sub-pixel SP(5,1) in the pixel 210(2,1) would be 5/4, and the second location parameter $f_y(5,1)$ of the sub-pixel SP(5,1) would be 1/1.

Figure 4:
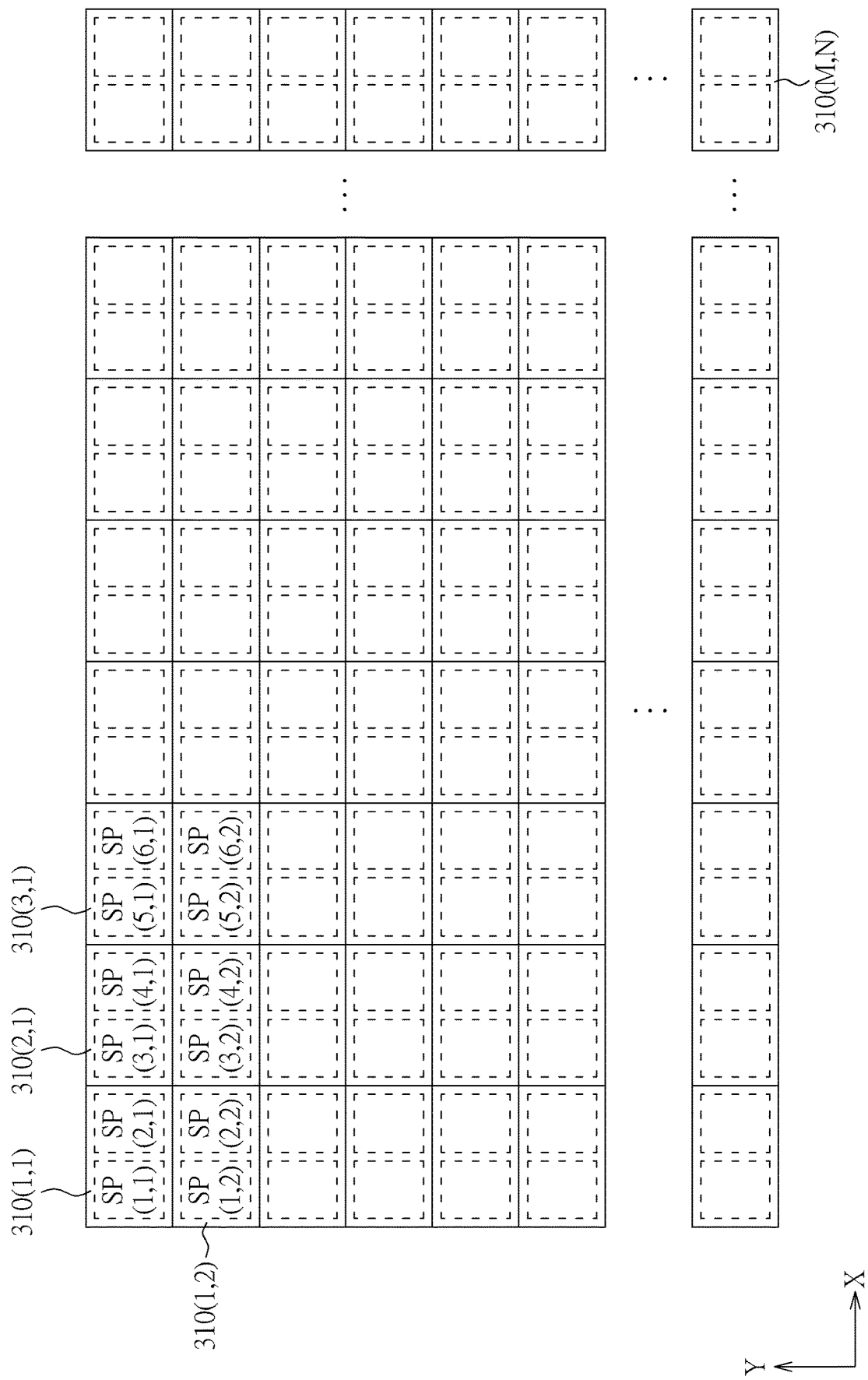
FIG. 4 shows a plurality of pixels according to another embodiment of the present disclosure.

FIG. 4 shows a plurality of pixels 310(1,1) to 310(M,N) according to another embodiment of the present disclosure. In FIG. 4, at least one of the pixels 310(1,1) to 310(M,N) includes two sub-pixels. For example, the pixel 310(1,1) includes sub-pixels SP(1,1) and SP(2,1) for emitting red light and green light respectively. Also, the pixel 310(2,1) includes sub-pixels SP(3,1) and SP(4,1) for emitting blue light and white light respectively. In pixel 310(1,1), there are two sub-pixels along the X direction so the first number a would be 2. Also, there is one sub-pixel along the Y direction so the second number b would be 1. In this case, the first location parameter $f_x(1,1)$ of the sub-pixel SP(1,1) in the pixel 310(1,1) would be 1/2, and the second location parameter $f_y(1,1)$ of the sub-pixel SP(1,1) would be 1/1. Also, the first location parameter $f_x(4,1)$ of the sub-pixel SP(4,1) in the pixel 310(2,1) would be 4/2, and the second location parameter $f_y(4,1)$ of the sub-pixel SP(4,1) would be 1/1.

Figure 5:
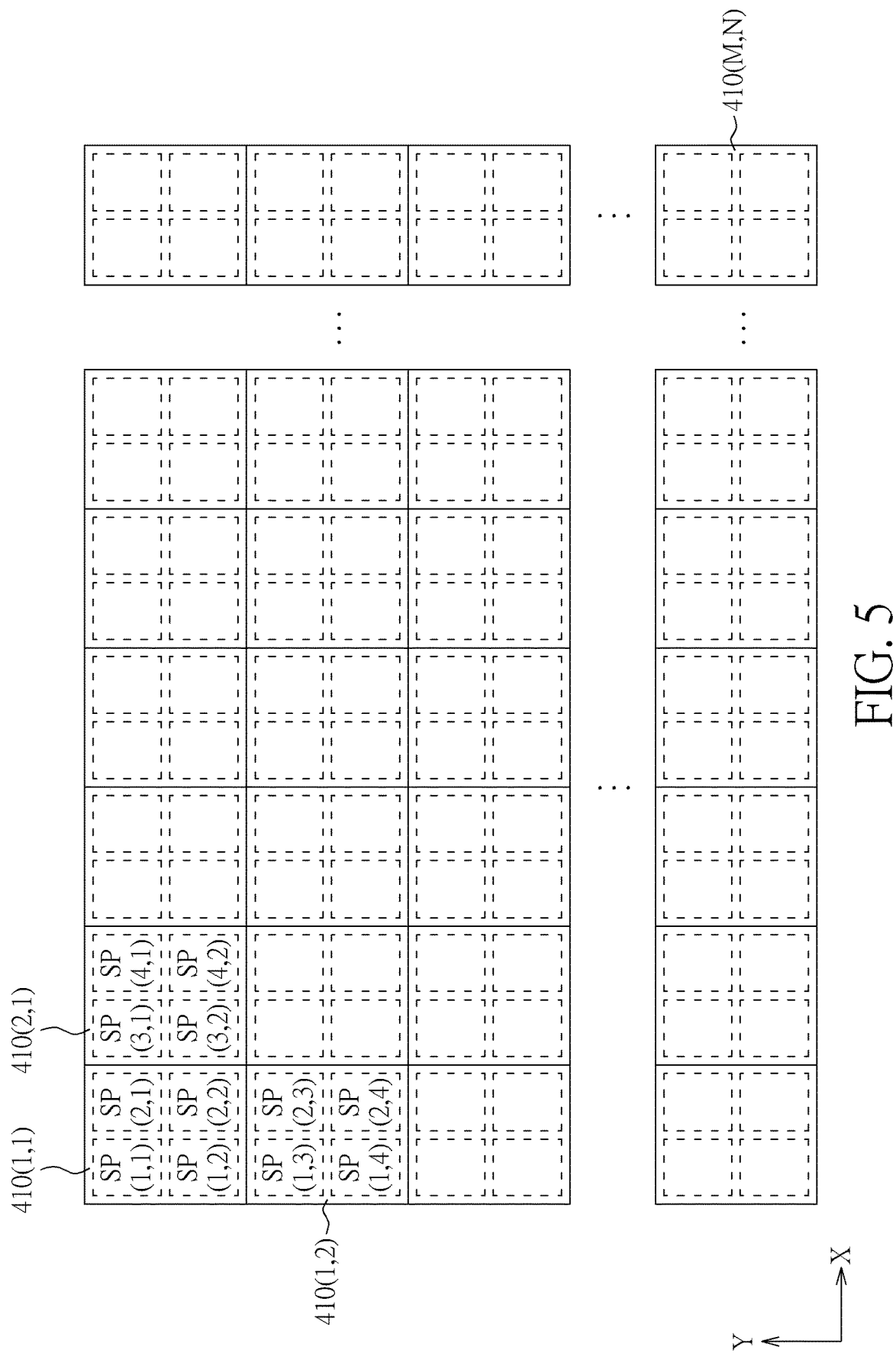
FIG. 5 shows a plurality of pixels according to another embodiment of the present disclosure.

FIG. 5 shows a plurality of pixels 410(1,1) to 410(M,N) according to another embodiment of the present disclosure. In FIG. 5, at least one of the pixels 410(1,1) to 410(M,N) includes four sub-pixels. For example, the pixel 410(1,1) includes sub-pixels SP(1,1), SP(2,1), SP(1,2) and SP(2,2) for emitting red light, green light, white light and blue light respectively. In pixel 410(1,1), there are two sub-pixels along the X direction so the first number a would be 2. Also, there are two sub-pixel along the Y direction so the second number b would be 2. In this case, the first location parameter $f_x(1,1)$ of the sub-pixel SP(1,1) in the pixel 410(1,1) would be 1/2, and the second location parameter $f_y(1,1)$ of the sub-pixel SP(1,1) would be 1/2. Also, the first location parameter $f_x(2,2)$ of the sub-pixel SP(2,2) in the pixel 410(1,1) would be 2/2, and the second location parameter $f_y(2,2)$ of the sub-pixel SP(2,2) would be 2/2. That is, formulas (1) and (2) can be general formulas for many different kinds of sub-pixel configuration.

Figure 6:
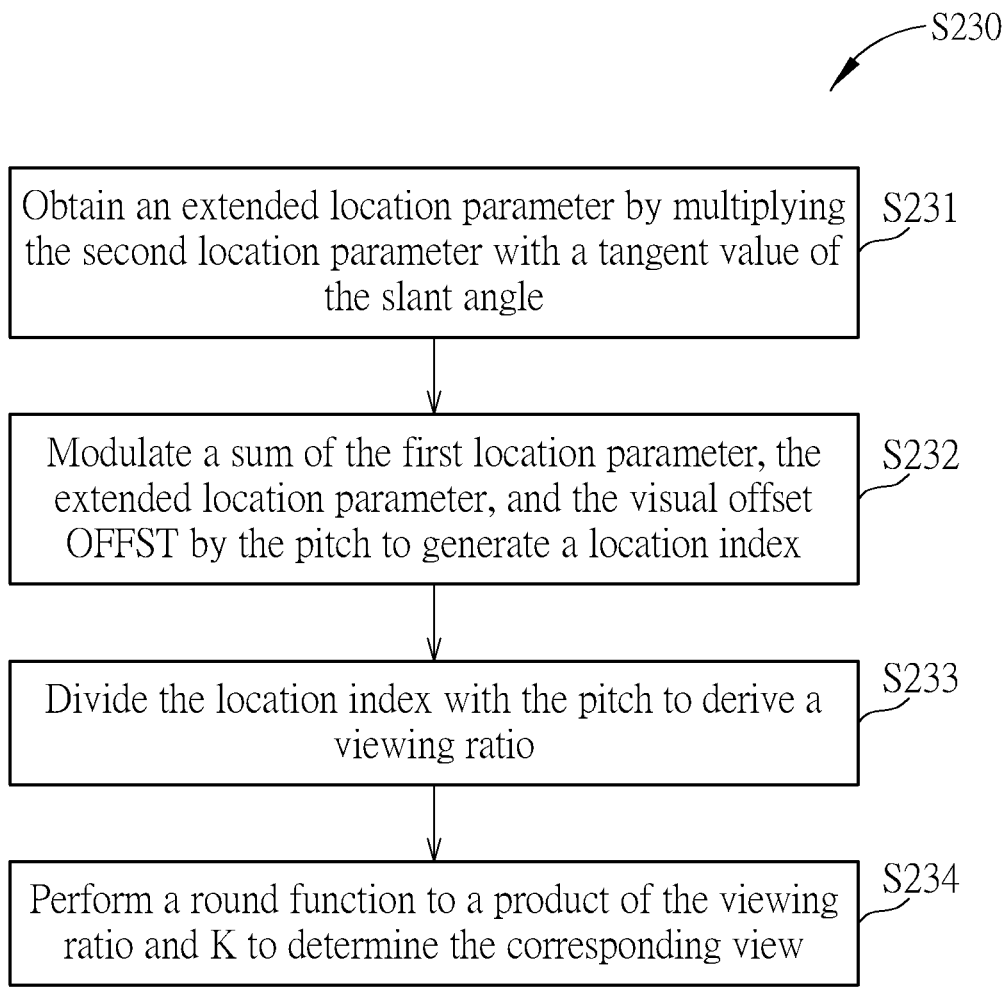
FIG. 6 shows sub-steps for determining the corresponding view of each sub-pixel according to one embodiment of the present disclosure.

After the location parameters of the sub-pixel are determined, the corresponding view to which the sub-pixel corresponds to can be determined according to the location parameters, the pitch of the optical modulator 120, the slant angle of the optical modulator 120, and the visual offset caused by the optical modulator 120 in step S230. In one example, the visual offset may be 0. FIG. 6 shows sub-steps S231 to S234 of step S230 for determining the corresponding view V of each sub-pixel according to one embodiment of the present disclosure.

S231: obtain an extended location parameter $E_y(i,j)$ by multiplying the second location parameter $f_y(i,j)$ with a tangent value of the slant angle θ;

S232: modulate a sum of the first location parameter $f_x(i,j)$, the extended location parameter $E_y(i,j)$, and the visual offset OFFST by the pitch P to generate a location index LI;

S233: divide the location index LI with the pitch P to derive a viewing ratio RV; and S234: perform a round function to a product of the viewing ratio RV and K to determine the corresponding view.

In some embodiments, sub-step S231 can be performed by using formula (3).

$$Ey(i,j)=fy(i,j)*\tan θ \qquad (3)$$

In some embodiments, since the method 200 tends to assign the corresponding view for each sub-pixel basically along the first direction, the second location parameter implying the position along the second direction would be extended to the first direction. Therefore, in sub-step S231, the extended location parameter Ey(i,j) can be derived by multiplying the second location parameter $f_y(i,j)$ with the tangent value of the slant angle θ.

After the extended location parameter Ey(i,j) is derived, sub-step S232 can generate the location index LI by modulating the sum of the first location parameter $f_x(i,j)$, the extended location parameter $E_y(i,j)$, and the visual offset OFFST by the pitch P as shown by the formula (4).

$$LI=\mathrm{mod}(fx(i,j)+Ey(i,j)+\mathrm{OFFST},P) \qquad (4)$$

In sub-step S232, the sum of the first location parameter $f_x(i,j)$ and the extended location parameter $E_y(i,j)$ can be seen as a generalized location parameter of the sub-pixel along the first direction, and the visual offset OFFST is mainly caused by the optical modulator 120.

In some embodiments, the pitch P of the optical modulator 120 can be determined according to the number of pixels corresponding to one unit of the optical modulator 120 along the first direction. For example, in FIG. 1, along the X direction, the first unit U1 of the optical modulator 120 can cover two pixels, so the pitch P can be determined to be 2 in this case. However, in some embodiments, due to the optical characteristics, the observing distance between the optical modulator 120 and the viewer, and the gap distance between the optical modulator 120 and the color filter layer of the pixels 110(1,1) to 110(M,N) may also be considered when generating the pitch P. For example, the pitch P may be determined by the formula (5) in some embodiments.

$$P=NP*(OVD+GP)/OVD \qquad (5)$$

In formula (5), NP is the number of pixels corresponding to one unit of the optical modulator 120 along the first direction, OVD is the observing distance between the optical modulator 120 and the viewer, and GP is the gap distance between the optical modulator 120 and the color filter layer. However, in some embodiments, if the error caused by the optical characteristics is insignificant or acceptable, the pitch P can be determined simply by the number of pixels NP corresponding to one unit of the optical modulator 120 without considering the observing distance OVD and the gap distance GP.

By modulating the sum of the first location parameter $f_x(i,j)$, the extended location parameter $E_y(i,j)$, and the visual offset OFFST by the pitch P, the location index LI can imply the normalized position of the sub-pixel along the first direction within one pitch P.

In step S233, the location index LI is divided by the pitch P as shown in the formula (6) to derive the viewing ratio RV.

$$RV=LI/P \qquad (6)$$

Later, in step S234, the product of the viewing ratio RV and K can be used to indicate the corresponding view. However, since the K views are numbered with serial integers, a floor function can be adopted to round down the product as shown in the formula (7) to determine the corresponding view V.

$$V=\mathrm{floor}(RV*K) \qquad (7)$$

In some other embodiments, the product of the viewing ratio RV and K may be rounded up or rounded off with other types of rounding functions according to the system requirement.

Furthermore, in some embodiments, sub-steps S231 to S234 can be performed by using formula (3) to formula (7) respectively. However, in some embodiments, some of the calculations performed by sub-steps S231 to S234 may be combined, and thus, the performing order of the sub-steps S231 to S234 can be flexible. For example, formulas (3) to (7) can be combined to form the formula (8), and the sub-steps S231 to S235 can also be performed by using formula (8).

$$V=\text{floor}[(\text{mod}(f_x(i,j)+f_y(i,j)*\tan\theta+\text{OFFST},P)/P)*K] \quad (8)$$

Furthermore, the method 200 can further include steps for obtaining the visual offset OFFST used in formula (4). In some embodiments, the visual offset OFFST may include an optical offset, a placement offset, and a lamination offset. However, in some embodiments, at least one of the optical offset, the placement offset and the lamination offset may be 0, but not limited thereto.

Figure 7:
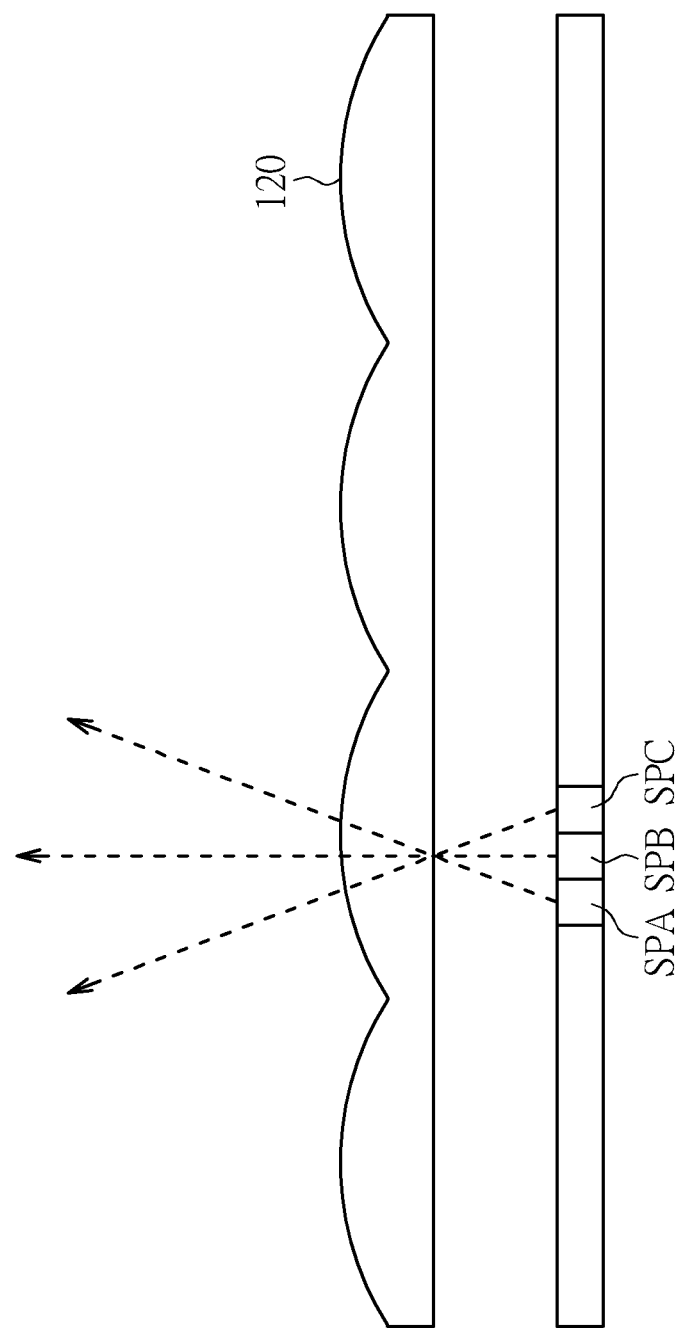
FIG. 7 shows the optical offsets caused by the optical modulator.

The optical offsets can be obtained according to the optical characteristics of the optical modulator. FIG. 7 shows the optical offsets caused by the optical modulator 120. In FIG. 7, sub-pixels SPA, SPB and SPC are adjacent to each other along the X direction. However, the optical modulator 120 may direct the light emitted by the sub-pixels SPA, SPB, and SPC to different directions according to its optical characteristics. That is, the sub-pixels disposed in different locations may have different optical offsets. In some embodiments, the optical offsets can be stored in an optical offset table, and the optical offset value corresponding to each sub-pixel (or each pixel) can be obtained by looking up the optical offset table when performing the method 200.

The placement offset is caused when placing the optical modulator 120. For example, in FIG. 1, the optical modulator 120 is not aligned with the pixel 110(1,1) perfectly, and the distance between the top left corner of the pixel 110(1,1) and the top left corner of the optical modulator 120 can be deemed as the placement offset. For example, the placement offset may be 1/3 pixel (e.g. one sub-pixel) as shown in FIG. 1, but not limited thereto, the placement offset may be ranged from 0 to 3 pixels, such as 2/3 pixel, 1 pixel, 2 pixels.

Figure 8:
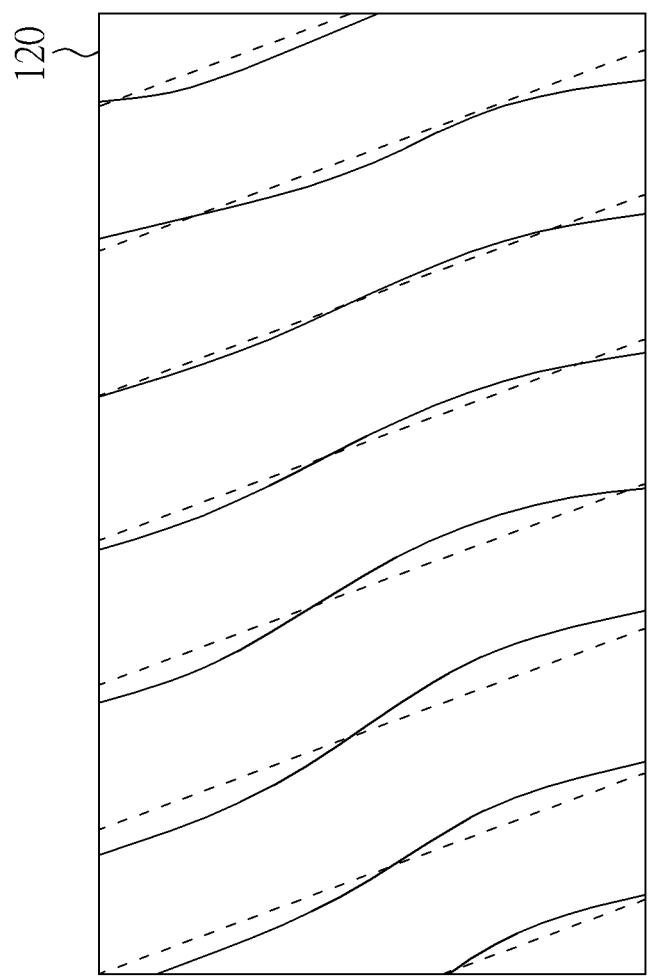
FIG. 8 shows the lamination offset caused by the placement of the optical modulator.

The lamination offset is caused by placing the optical modulator 120 imperfectly. FIG. 8 shows the lamination offset caused by the placement of the optical modulator 120. In FIG. 8, the dotted lines show the ideal edges of each unit of the optical modulator 120 while the solid lines show the real edges of each unit of the optical modulator 120. In FIG. 8, due to imperfect placement, at least a portion of the real edges of the units of the optical modulator 120 may be crooked, and thus, the optical offsets recorded previously may be shifted. In some embodiments, the lamination offset may also be stored in a lookup table.

After the corresponding view V of the sub-pixel SP(i,j) is determined, the displaying data will be assigned to the sub-pixel SP(i,j) according to the corresponding view V and the image data. For example, if the corresponding view of the sub-pixel SP(4,1) is determined to be the second view of the K views, then the corresponding displaying data will be assigned to the sub-pixel SP(4,1) from the image data corresponding to the second view.

In some embodiments, if the corresponding views of the sub-pixels are fixed, the method 200 can further store the corresponding views of the sub-pixels in an allocation table. Consequently, the displaying data can be assigned to the sub-pixels faster without calculating the corresponding views of the sub-pixels repeatedly.

In summary, the method for displaying a stereoscopic image on a display device provided by the embodiments of the present disclosure can determine the corresponding view for each sub-pixel no matter what the sub-pixel configuration is. Furthermore, since the method provided by the embodiments also takes the visual offset caused by the optical modulator, the determination of the corresponding view for each sub-pixel can be even more accurate, thereby improving the visual quality of stereoscopic image displayed by the display device.

Those skilled in the art will readily observe that numerous modifications and alterations of the device and method may be made while retaining the teachings of the disclosure. Moreover, each of the claims constitutes an individual embodiment, and the scope of the disclosure also includes the scope of the various claims and combinations of the embodiments. Accordingly, the above disclosure should be construed as limited only by the metes and bounds of the appended claims.

What is claimed is:

1. A method for displaying a stereoscopic image on a display device, the display device comprising a plurality of pixels and an optical modulator, the method comprising:
   obtaining image data of the stereoscopic image corresponding to K views, wherein K is an integer greater than 1;
   for each sub-pixel in at least a portion of the plurality of pixels, determining location parameters of the sub-pixel according to a first coordinate value of the sub-pixel along a first direction, a first number of sub-pixels along the first direction in one of the at least a portion of the plurality of pixels, a second coordinate value of the sub-pixel along a second direction, and a second number of sub-pixels along the second direction in the one of the at least a portion of the plurality of pixels, comprising:
      dividing the first coordinate value by the first number to obtain a first location parameter of the location parameters; and
      dividing the second coordinate value by the second number to obtain a second location parameter of the location parameters;
   determining a corresponding view of the K views which the sub-pixel corresponds to according to the location parameters, a pitch of the optical modulator, a slant angle of the optical modulator, and a visual offset caused by the optical modulator; and
   assigning displaying data to the sub-pixel according to the corresponding view and the image data.

2. The method of claim 1, wherein determining the corresponding view of the K views which the sub-pixel corresponds to according to the location parameters, the pitch of the optical modulator, the slant angle of the optical modulator, and the visual offset caused by the optical modulator comprises:
   obtaining an extended location parameter by multiplying the second location parameter with a tangent value of the slant angle;
   modulating a sum of the first location parameter, the extended location parameter, and the visual offset by the pitch to generate a location index;
   dividing the location index with the pitch to derive a viewing ratio; and
   performing a round function to a product of the viewing ratio and K to determine the corresponding view.

3. The method of claim 1, wherein the one of the at least a portion of the plurality of pixels comprises three sub-pixels, the first number of sub-pixels along the first direction is 3, and the second number of sub-pixels along the second direction is 1.

4. The method of claim 1, wherein the one of the at least a portion of the plurality of pixels comprises four sub-pixels, the first number of sub-pixels along the first direction is 4, and the second number of sub-pixels along the second direction is 1.

5. The method of claim 1, wherein the one of the at least a portion of the plurality of pixels comprises two sub-pixels, the first number of sub-pixels along the first direction is 2, and the second number of sub-pixels along the second direction is 1.

6. The method of claim 1, wherein the one of the at least a portion of the plurality of pixels comprises four sub-pixels, the first number of sub-pixels along the first direction is 2, and the second number of sub-pixels along the second direction is 2.

7. The method of claim 1, further comprising determining the pitch of the optical modulator according to a number of pixels corresponding to one unit of the optical modulator along a first direction.

8. The method of claim 1, further comprising determining the pitch of the optical modulator according to a number of pixels corresponding to one unit of the optical modulator along a first direction, an observing distance between the optical modulator and a viewer, and a gap distance between the optical modulator and a color filter layer of the plurality of pixels.

9. The method of claim 1, further comprising obtaining the visual offset caused by the optical modulator.

10. The method of claim 9, wherein obtaining the visual offset caused by the optical modulator comprises:
    obtaining an optical offset according to optical characteristics of the optical modulator.

11. The method of claim 10, wherein obtaining the visual offset caused by the optical modulator further comprises:
    obtaining a placement offset after the optical modulator is disposed on the plurality of pixels.

12. The method of claim 10, wherein obtaining the visual offset caused by the optical modulator further comprises:
    obtaining a lamination offset after the optical modulator is disposed on the plurality of pixels.

13. The method of claim 1, further comprising generating the image data in real-time.

14. The method of claim 1, further comprising reading the image data from a processing circuit.

15. The method of claim 1, further comprising storing corresponding views of a plurality of sub-pixels of the at least a portion of the plurality of pixels in an allocation table.

16. The method of claim 11, wherein the placement offset is 0.

* * * * *